Figure 1:
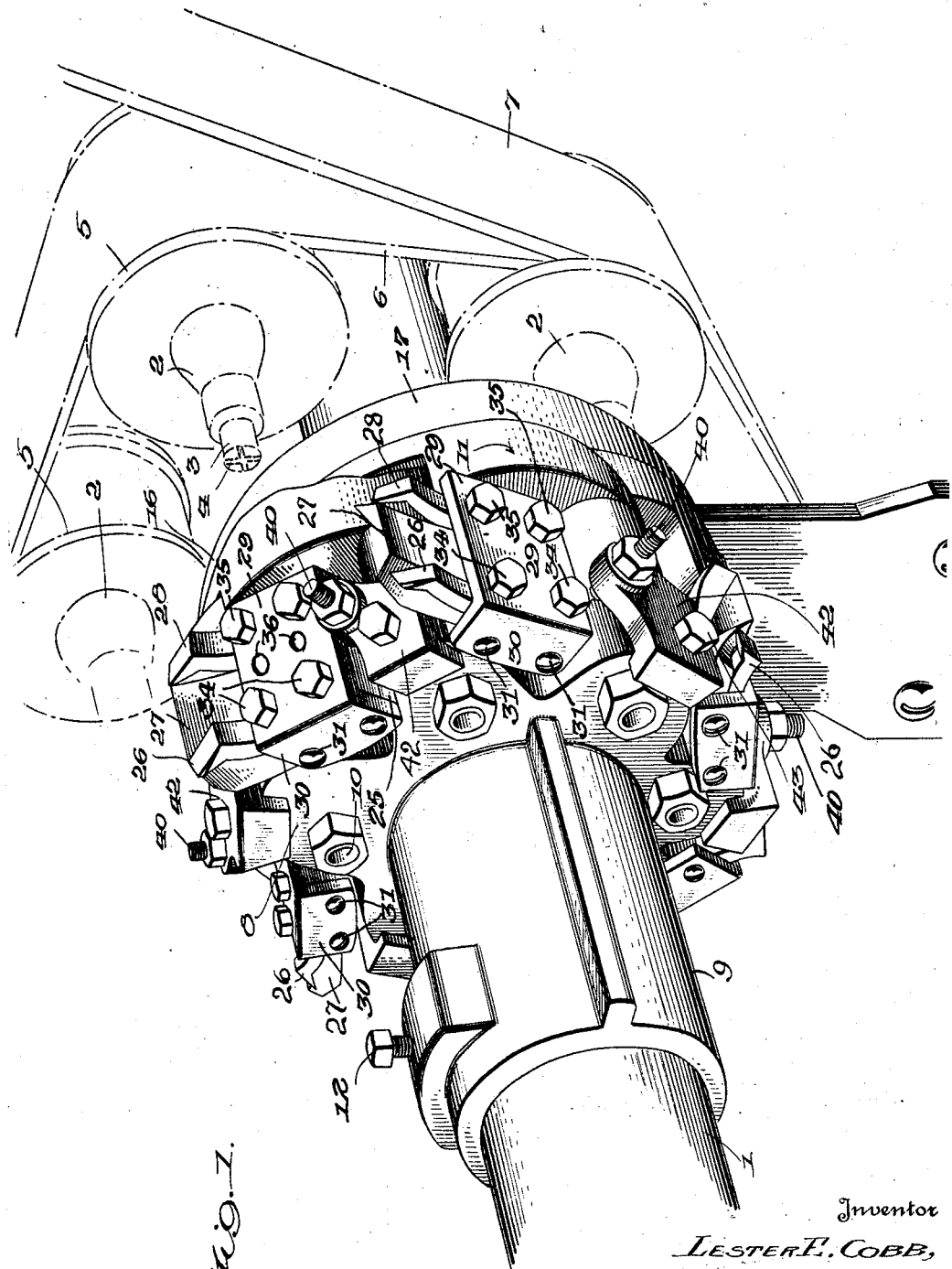

Sept. 16, 1930.  L. E. COBB  1,776,180
CUTTER CARRYING HEAD FOR MULTIPLE LATHES
Filed April 21, 1928   4 Sheets-Sheet 1

Inventor
Lester E. Cobb,
By
Attorney

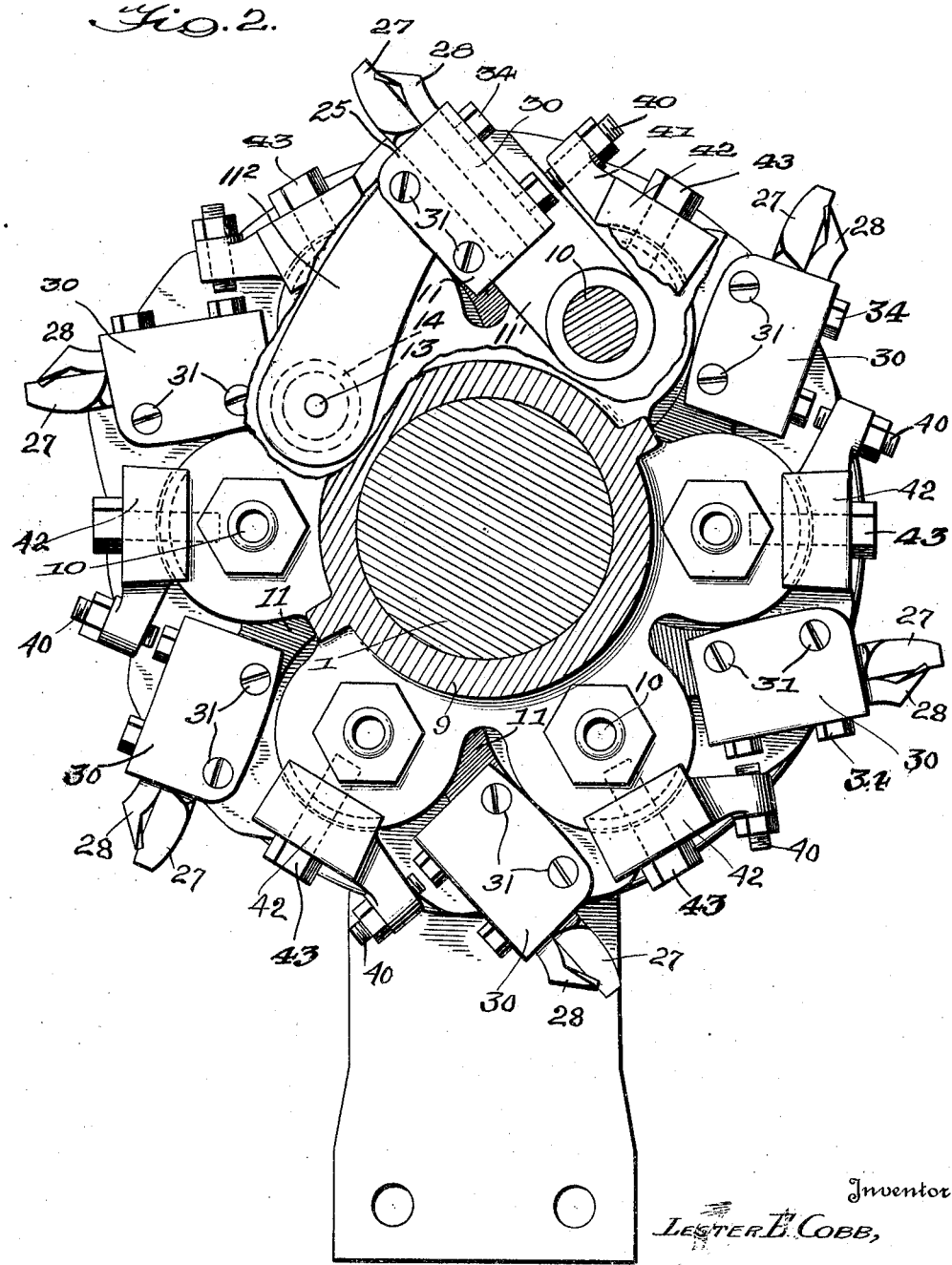

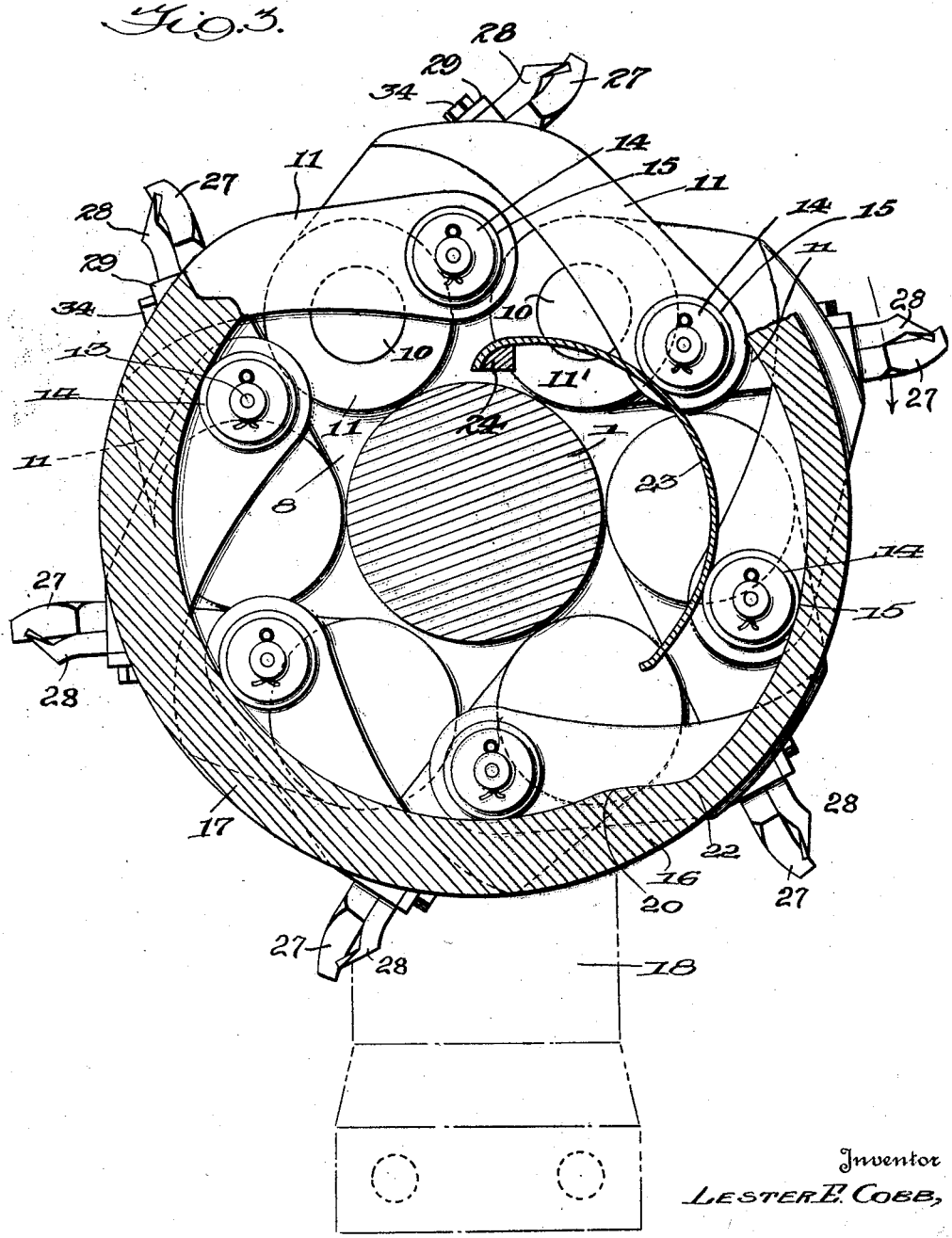

Sept. 16, 1930.  L. E. COBB  1,776,180
CUTTER CARRYING HEAD FOR MULTIPLE LATHES
Filed April 21, 1928   4 Sheets-Sheet 4
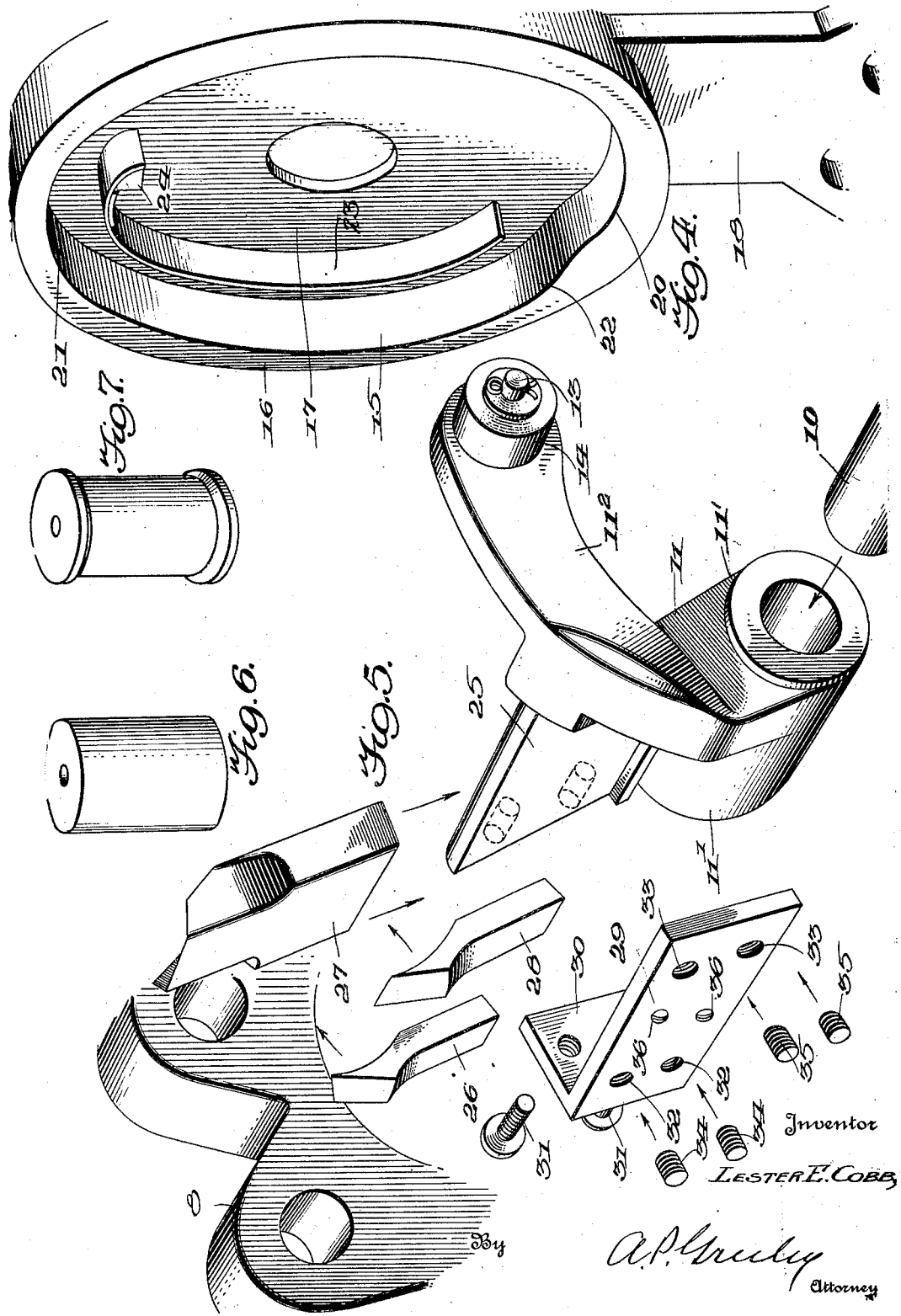
Inventor
LESTER E. COBB
By A. P. Greely
Attorney Patented Sept. 16, 1930

1,776,180

UNITED STATES PATENT OFFICE

LESTER E. COBB, OF NORWAY, MAINE

CUTTER-CARRYING HEAD FOR MULTIPLE LATHES

Application filed April 21, 1928. Serial No. 271,864.

My invention relates to multiple turning lathes in which blocks of wood of uniform length are fed to rotating disks or other carriers for a plurality of shafts, one of which carries a series of positively rotated heads each corresponding to the head stock of a lathe, and the other of which carries a corresponding series of shafts each free to rotate but movable longitudinally of their axis each corresponding to the tail stock of a lathe, so that each block is clamped between a rotated head and the longitudinally movable shaft opposite it and rotated rapidly while being carried bodily onward by the rotation of the disks, being subjected as it is carried onward to the action of a suitably shaped cutter which acts upon the rotating block to shape it. Machines of this general character are well known and are shown in a number of United States Patents such, for instance, as the patent to T. D. Smith, Number 1,001,561, dated Aug. 22, 1911. The general construction of such a machine forms no part of my present invention which relates particularly to the cutter carrying head and means by which the cutters are brought into action and withdrawn.

With the objects above indicated and other objects hereinafter described in view my invention consists in the construction and combination of parts hereinafter described and claimed.

Referring to the drawings:

Figure 1 is a perspective view of a cutter carrying head embodying my invention.

Figure 2 is a face view partly broken away of the cutter carrying head, the main shaft of the machine being shown in cross-section.

Figure 3 is a cross sectional view partly broken away of the cam which controls the cutter carrying arms.

Figure 4 is a perspective view of the cam shown in Figure 3.

Figure 5 is a perspective view of the cutter carrying arms and the cutters showing the parts separated.

Figure 6 is a perspective view of a blank ready for insertion in the machine, and Figure 7 is a perspective view of a finished spool formed by the machine from the blank shown in Figure 6.

In the drawings 1 indicates the main shaft of the machine carrying supporting means for a series of spindles 2 each provided with a head 3 the end of which is provided with teeth 4 adapted to engage one end of a block of wood so that when the spindle 2 is rotated the block will be rotated, the other end of the block being held as in an ordinary turning lathe by a spindle opposite to and in line with the spindle 2 of the head 3 as in the patent to Smith above referred to. The spindles 2 each carry a pulley 5, the pulleys of the several spindles 2 being operatively connected together by belt 6 which is driven by belt 7 from any convenient power. Between the carriers for spindles 2 and the carriers for the opposing spindles is arranged the cutter carrying head comprising a disk 8 carrying a series of stub shafts 10 on which are mounted arms 11 carrying the cutters. From the disk 8 extends a hub 9 which by set screw 12, or other convenient means, is secured on shaft 1 so that disk 8 is so secured to shaft 1 that it will rotate with it. The cutter carrying arms 11 are each L shaped, the laterally extending leg $11^2$ of the L carrying at its free end a pin 13 on which is journalled a roller 14, which extends into the hollow of a cam 15 formed on the inner face of a rim 16 carried by a cam disc 17 and extending at right angles to the face of this disk. Cam disk 17 is held stationary by means of an arm 18 extending radially from it, preferably downward, and bolted or otherwise secured to the frame of the machine. This cam disk is arranged between the cutter carrying head and the rotating head 3. The other leg $11^1$ of the L extends inward towards the shaft 1 and has at its end an opening to fit over a stub shaft 10 on disk 8.

The cam 15 is so formed that the portion of its cam surface from 20 to 21 is on an arc of a circle of relatively short radius while from 21 to 22 its radial distance from the centre of the disk gradually increases and from 22 to 20 its radial distance is sharply lessened. By reason of this form of the cam the rollers 14 while traveling from 20 to 21 are held toward the centre of shaft 1 so as to hold their cutters in retracted position; while traveling from 21 to 22 the rollers 14 are permitted to move outward to move their cutters into engagement with the block of wood to be turned and by the portion of the cam between 22 and 20 the rollers are moved inward to be held in their retracted position by the portion 20 to 21. A spring 23 within the path of movement of rollers 14 is arranged to press outward against these rollers while they are traveling from 21 to 22 so as to force them yieldingly outward against or nearly against the surface of the cam. This spring 23 may be so secured at one end to the disk 17 in any convenient manner as by angle plate 24 that its free end will extend in the direction of movement of the rollers 14 opposite the portion of the cam between 21 and 22. The rotation of disk 8, particularly if at high speed, tends by centrifugal action to hold rollers 14 against the surface of cam 15 and so to throw the cutters outward into action upon the wooden blocks to be turned. The spring 23 aids this centrifugal action and ensures a gradual outward movement of the cutters as they bite further and further into the material of the wooden block being turned.

The cutter carrying arms 11 are each provided with a plate 25 extending outward from the junction of its two legs at substantially right angles to the leg which carries roller 13 and also extending laterally in a direction away from cam disk 17. This plate is carried by the leg $11^1$ of arm 11 and is machined off on its outer face to receive the cutters 26, 27 and 28. An angle plate 29 having its inwardly extending portion 30 filling the free end of plate 25 serves to clamp the cutters to plate 25, the portion 30 being secured to the end of plate 25 by screws 31. The main portion of angle plate 29 is provided with threaded openings 32, 32, and 33, 33, to receive screws 34, 34, and 35, 35, by which the side cutters 26 and 28 may be firmly secured in place. Similar threaded openings 36, 36 may be provided for clamping the centre cutter 27.

The outward movement of each of the cutter carrying arms is adjustably regulated by a set screw 40 carried by arm 41 of a plate 42 secured on disk 8 by screw 43, the inner end of set screw 40 being in the path of movement of the free end portion of cutter carrying arm 11.

The number of cutters may be varied and their cutting edges may be of any shape necessary to form the particular article desired. The cutters 26, 27, 28, here shown are shaped to form a spool such as is used to hold silk, cotton or other thread, the cutter 27 being adapted to form the central part of the spool with the inner faces of the heads and cutters 26 and 28 being adapted to turn off the outer faces of the heads.

In operation a block of wood being in place between a head 3 and the opposite tail stock spindle, the shaft 1 being rotated in the direction indicated by arrows on Figures 1, 2 and 3, the rotation of the shaft 1 carrying with it the heads 3, these heads being themselves rotated on their own axes, and also carrying with it the cutter carrying head, the cam 15 permits the cutter carrying arm 11 to move outward under the influence of spring 23 as well as by centrifugal force. As the arm 11 swings outward the cutters 26, 27, 28, are brought into contact with the block to gradually cut away material so as to leave the block shaped to the spool form desired. This turning or shaping of the wooden block is completed while the roller 14 is passing from points 21 to 22 of cam 15. At this point in the rotation of shaft 1 and the parts carried by it the spindle opposite head 3 is drawn back as in the Smith patent above referred to to release the spool which is thrown off by contact with a suitable fixed arm.

In the machine shown six heads 3 and a corresponding number of cutter carrying arms are shown and, of course, a corresponding number of the tail stock shafts must be used. But the number of these sets of parts may be varied as desired depending upon the diameter given to the cutter carrying head and the parts carrying the heads 3 and depending also on the diameter of the article to be turned.

It will, of course, be understood that details of construction and arrangement may be varied without departing from the spirit of my invention.

Having thus described my invention what I claim is:—

1. In a machine of the class described having a main shaft and rotary work carriers mounted to revolve with the main shaft about its axis, a cutter carrying head rotating with said shaft having a plurality of cutter carrying arms each pivoted on an axis parallel with the main shaft having a cutter at its outer end and having an extension whose end is adapted to be engaged by a cam, a fixed cam plate having a cam formed thereon adapted to act upon the inner ends of said extensions of the cutter carrying arms to swing their cutter carrying ends away from the axis of the shaft and yielding means adapted to act upon the said extensions of the cutter carrying arms to aid in swinging their cutter carrying ends away from the axis of the shaft.

2. In a machine of the class described having a main shaft and rotary work carriers mounted to revolve with the main shaft about its axis, a cutter carrying head rotating with said shaft having a plurality of cutter carrying arms each pivoted on an axis parallel with the main shaft having a cutter at its outer end and having an extension whose end is adapted to be engaged by a cam, a fixed cam plate having a cam formed thereon adapted to act upon the inner ends of said extensions of the cutter carrying arms to swing their cutter carrying ends away from the axis of the shaft, and a spring carried by the cam plate adapted to act upon the said extension of the cutter carrying arms to aid in swinging their cutter carrying ends away from the axis of the shaft.

3. In a machine of the class described having a main shaft and rotary work carriers mounted to revolve with the main shaft about its axis, a cutter carrying head rotating with said shaft having a plurality of cutter carrying arms each pivoted on an axis parallel with the main shaft having a cutter at its outer end and having an extension, the inner end of which carries a roller adapted to be engaged by a cam, a fixed cam plate having a rim at its periphery extending towards the cutter head said rim having on its inner face a cam adapted to act upon the inner ends of said extensions of the cutter carrying arms to swing their cutter carrying ends away from the axis of the shaft, and yielding means carried by the cam plate adapted to act upon the said extensions of the cutter carrying arms to aid in swinging their cutter carrying ends away from the axis of the shaft.

4. In a machine of the class described having a main shaft and rotary work carriers mounted to revolve with the main shaft about its axis, a cutter carrying head rotating with said shaft having a plurality of cutter carrying arms each pivoted on an axis parallel with the main shaft having a cutter at its outer end and having an extension whose end is adapted to be engaged by a cam, a fixed cam plate having a peripheral rim extending towards the cutter head having on its inner face a cam adapted to act upon the inner ends of said extensions of the cutter carrying arms to swing their cutter carrying ends away from the axis of the shaft, and a spring secured at one end to the cam plate having its free end opposite the cam and adapted to act upon the said extensions of the cutter carrying arms to aid in swinging their cutter carrying ends away from the axis of the shaft.

In testimony whereof, I hereunto affix my signature.

LESTER E. COBB.